UNITED STATES PATENT OFFICE.

HAYDN M. BAKER, OF WASHINGTON, DISTRICT OF COLUMBIA, ASSIGNOR TO JOHN M. SMITH, OF BROOKLYN, NEW YORK.

IMPROVEMENT IN THE PREPARATION OF PAPER-STOCK.

Specification forming part of Letters Patent No. 105,884, dated August 2, 1870.

I, HAYDN M. BAKER, of Washington city, in the District of Columbia, have ivented an certain Process for the Preparation of Paper-Stock, of which the following is a specification:

Take straw, wood, hemp, jute, or other fibers in any quantity convenient to manipulate in the apparatus one may have at hand, the said fibers having been previously prepared in the usual manner for maceration. Place the fiber so prepared in the macerating-rotary, with a solution of silicate of soda, consisting of dry silicate of soda, equal to one-fifth the weight of fiber to be treated, and sufficient water to keep the fiber continually immersed below the surface of the said silicate soda. Any other soluble silicate will do as of well.

Now impart a rotating motion to the macerating-vessel, and inject steam in the usual manner well known to paper-manufacturers; but the inventor desires here to state that steam superheated to 300° or 340° Fahrenheit greatly facilitates the process of maceration; so also does a high pressure attained by the injection of the steam.

No definite amount can be fixed upon as regards the degree of pressure; but the inventor will now state that an increased advantage is acquired with an increase of pressure from (5 lbs.) five pounds to (150 lbs.) one hundred and fifty pounds per square inch.

At the end of four hours the maceration is complete, when high pressure and superheated steam have been employed, and about six hours when the more ordinary conditions have been observed.

The next step consists in bleaching, which is to be done in the usual manner, or may be effected in a bleaching-rotary, under pressure, with a solution of oxychloride of calcium.

In this process the silicate-of-soda solution attacks the silicates and other extraneous matter in the same manner as the caustic-soda solution of the past and present processes has, and does do, and yet does not destroy and waste the fiber like that compound.

The invention consists entirely in the use of the soluble silicates instead of caustic soda in the maceration of crude material for the preparation of paper-stock, and also the employment of elevated temperature and high pressure in conjunction with the use of silicate of soda or other soluble silicates.

Claim.

What I claim as my invention, and desire to secure by Letters Patent, is—

The use of the soluble silicates, with and without the assistance of extraordinary pressure and temperature, for the purpose of subduing straw, wood, hemp, jute, cotton-seed hulls, and other sources of fibrine, for the production of paper-stock, in the manner herein described and set forth.

HAYDN M. BAKER.

Witnesses:
J. C. STRANG,
J. SMITH.